US007981314B2

(12) United States Patent
McCormick et al.

(10) Patent No.: US 7,981,314 B2
(45) Date of Patent: Jul. 19, 2011

(54) CORROSION INHIBITOR FORMULATIONS WITH IMPROVED PERFORMANCE, LOWER TOXICITY AND REDUCED MANUFACTURING HAZARDS

(75) Inventors: David R. McCormick, Clawson, MI (US); James P. Bershas, West Bloomfield, MI (US)

(73) Assignee: Henkel KGaA, Duesseldorf (DE)

( * ) Notice: Subject to any disclaimer, the term of this patent is extended or adjusted under 35 U.S.C. 154(b) by 984 days.

(21) Appl. No.: 11/431,780

(22) Filed: May 10, 2006

(65) Prior Publication Data

US 2007/0018135 A1 Jan. 25, 2007

Related U.S. Application Data

(60) Provisional application No. 60/682,931, filed on May 20, 2005.

(51) Int. Cl.
*C09K 5/00* (2006.01)

(52) U.S. Cl. ................ 252/71; 252/72; 252/73; 252/74; 252/75; 252/77

(58) Field of Classification Search ........................ None
See application file for complete search history.

(56) References Cited

U.S. PATENT DOCUMENTS

| | | | | |
|---|---|---|---|---|
| 2,758,970 | A | 8/1956 | Saukaitis et al. | |
| 3,634,270 | A * | 1/1972 | Engle et al. | 510/258 |
| 4,541,945 | A * | 9/1985 | Anderson et al. | 510/253 |
| 2005/0123437 | A1 | 6/2005 | Cassidy et al. | |

* cited by examiner

*Primary Examiner* — Necholus Ogden, Jr.
(74) *Attorney, Agent, or Firm* — Mary K. Cameron; Henkel Corporation

(57) ABSTRACT

Aqueous corrosion inhibitor compositions, preferably storage-stable, useful in acidic cleaning solutions for cleaning the surfaces of metal, comprising reaction products of at least one rosin amine component, at least one non-flammable liquid ketone component, at least one carboxylic acid component, at least one paraformaldehyde component and water; aqueous acidic cleaners prepared therefrom; and methods of their use. The inventive corrosion inhibitor compositions are made by a simple process which reduces the presence of toxic and/or flammable raw materials, co-products, residual reactants and chloride ion while providing acid inhibition in aqueous acidic cleaners.

19 Claims, No Drawings

CORROSION INHIBITOR FORMULATIONS WITH IMPROVED PERFORMANCE, LOWER TOXICITY AND REDUCED MANUFACTURING HAZARDS

CROSS-REFERENCE TO RELATED APPLICATION

This application claims priority from U.S. Provisional Application Ser. No. 60/682,931 filed 20 May 2005 and incorporated herein by reference in its entirety.

FIELD OF THE INVENTION

This invention relates to new corrosion inhibitor compositions for use in corrosion inhibitor formulations for acidic cleaning and pickling products. More particularly, the invention relates to new chemical compositions for use in corrosion inhibitors, with superior performance in reducing corrosion of stainless steels exposed to hot HCl, which can be made by a simple process which reduces the presence of toxic and/or flammable raw materials, co-products, residual reactants and chloride ion.

BACKGROUND OF THE INVENTION

Vessels, pipes, condensers and boilers used in the chemical & food processing industries, power plants, oil field operations are subject to the formation of scale, which interferes with functioning. The word "scale" when used herein includes any solid deposit formed on a solid ferriferous metal surface as a result of contact between the metal surface and an aqueous solution in liquid or vapor state. During use, water storage tanks, conduits, plumbing, cooling towers, process equipment, electrolysis membranes and other units develop scale which must be removed, preferably dissolved. Typically, this scale is removed using an acid solution, generally a solution of hydrochloric acid. To accelerate the cleaning process, the aqueous acidic cleaner is often heated to as high as 180 deg C. Temperatures greater than the boiling point of the cleaner are used by keeping the cleaner under greater than ambient pressure. The hydrochloric acid is usually present in the cleaners in a concentration range of from 2 to 20% by weight, which, upon repealed use, can be quite damaging to the metal parts of the aforementioned units.

In order to protect metal components of equipment from the acidic cleaner during the cleaning cycle, corrosion inhibitors have been added to the acidic cleaning mixtures. Compositions that inhibit the attack of acid on metallic surfaces, but still allow dissolution of scale are known in the industry. Many suffer from the drawbacks of toxicity and/or are hazardous to the environment, e.g. arsenic containing inhibitors and petroleum based inhibitors such as those containing naphthalene derivatives.

Derivatives of rosin amines, such as those described in U.S. Pat. No. 2,758,970, incorporated herein by reference, are also known. A drawback of many known commercial rosin amine derivative acid inhibitor compositions is the use of HCl, liquid formaldehyde and acetone as raw materials in the process for making these prior art compositions, often in the presence of flammable solvent.

Each of these raw materials has drawbacks in manufacturing acid inhibitor compositions. HCl is a volatile, corrosive substance that is hazardous to use. HCl also contributes chloride ion, which makes the chloride carrying inhibitor composition unsuitable for some applications, such as nuclear reactor cleaning, due to corrosion concerns. Formaldehyde is a known carcinogen and the amount of residual monomer left in the rosin amine derivatives is regulated. Uninhibited liquid formaldehyde is unstable in the absence of added methanol and gives rise to health and safety concerns in manufacture. Acetone's low flash point makes it a manufacturing risk that requires special handling, as does the typical solvents used in making the prior art rosin amine derivatives. It has also been discovered by Applicants that residual acetone and formaldehyde, in some of the prior an acid inhibitors, participate in a side reaction to produce the toxic and flammable methyvinylketone (MVK), which has been misidentified in the past as methyethylketone (MEK).

Rosin amine derivatives typically used in the industry are also difficult to manufacture. Successful production of a commercially useful (non-solid and miscible in water) derivative requires a complex set of process steps that include first reacting the rosin amine with formaldehyde and a ketone, and then adding additional liquid formaldehyde and acetone followed by further reaction, and subsequent distillation of residual reactants and solvent. The use of HCL in the process requires a specialized reactor and distillation equipment. Undesirable chlorinated, side-reaction products have also been identified in the prior art rosin amine derivatives. Some known rosin amine derivatives also have drawbacks regarding flammability, for example, one known product has a flash point (cc) of 89 deg. F. Another limitation of known rosin amine derivatives is lack of homogeneity, where typical derivatives have limited stability and settle into two layers in the absence of the addition of surfactant and solvent.

Due in pan to the foregoing drawbacks, although known rosin amine derivatives have had some success in the industry, there is a continuing need for improved performance in the corrosion inhibitors, as well as improved stability. With increasing awareness of health, safety and environmental issues, the industry is requiring use of lower flammability, lower VOC raw materials, and users are demanding user friendly products, with low residual formaldehyde, with the same or better performance as known products. There is therefore a continued need for improved corrosion inhibitor compositions for corrosion inhibitor formulations used in acid cleaners. In particular, there is a need for corrosion inhibitor compositions that are simple to make, reduce the presence of VOCs and toxic and/or flammable raw materials, co-products, residual reactants and chloride ion. In addition, the replacement of ethoxylated phenol surfactants is a desired goal in any new inhibitor formulation due to recent environmental concerns.

SUMMARY OF THE INVENTION

The corrosion inhibitor compositions of the invention comprise, preferably consist essentially of, most preferably consist of the reaction products of:

A. At least one rosin amine component;

B. At least one non-flammable liquid ketone component;

C. At least one carboxylic acid component;

D. At least one formaldehyde, preferably a paraformaldehyde component; and

E. Water

An object of the invention was to provide corrosion inhibitor compositions using these types of reaction products made without flammable materials. It is another object of the invention to avoid the distillation/recycle step required in prior an synthesis methods. It is a further object of the invention to make the reaction products without hydrochloric acid. "Without" as used to describe these components will be understood by those of skill in the art to mean less than, in increasing order of preference 5, 4, 3, 2, 1, 0.1, 0.01, 0.001, 0.0001, 0.00001 g/l, most preferably in the absence of the particular component.

It is also an object of the invention to provide improved corrosion inhibitors for stainless steel as compared to similarly formulated corrosion inhibitors of the prior art.

It is also an object of the invention to provide an aqueous corrosion inhibitor composition that is a single phase liquid having a flash point of at least 180 deg. F.

It is an object of the invention to provide an aqueous corrosion inhibitor composition wherein at least 50 wt % of the rosin amine component (A) is dehydroabietylamine.

It is an object of the invention to provide an aqueous corrosion inhibitor composition wherein component (B) is acetophenone, hydroxyacetophenone and/or di-acetophenone.

It is an object of the invention to provide an aqueous corrosion inhibitor composition wherein component (C) is formic, glycolic, and/or citric acid.

It is a further object of the invention to provide an aqueous corrosion inhibitor wherein component (B) comprises acetophenone, component (C) comprises glycolic acid and component (D) comprises paraformaldehyde.

It is a further object of the invention to provide an aqueous corrosion inhibitor further comprising at least one of: a surfactant, an acetylenic alcohol, a solvent, and/or a pH adjuster.

It is another object of the invention to provide an aqueous corrosion inhibited acid cleaning composition comprising:

(1) from about 1 to about 50% by weight of an acid;

(2) a corrosion inhibiting effective amount of an aqueous corrosion inhibitor composition, comprising the reaction products of:

(A) at least one rosin amine component;

(B) at least one non-flammable liquid ketone component;

(C) at least one carboxylic acid component having a flash point of at least 115 deg. F.;

(D) at least one paraformaldehyde component; and (E) water.

It is a further object of the invention to provide an aqueous corrosion inhibited acid cleaning composition further comprising at least one of: a surfactant, an acetylenic alcohol, a solvent, and/or a pH adjuster. It is another object of the invention to provide a method of cleaning metal comprising contacting a metal surface with any of the cleaning compositions recited above.

It is a yet further object of the invention to provide method of making an aqueous corrosion inhibitor composition comprising:

(A) Mixing, in a sealed reactor, the following reactants: at least one rosin amine component, at least one non-flammable liquid ketone component, at least one carboxylic acid component having a flash point of at least 115 deg. F., at least one paraformaldehyde component and water:

(B) Heating the reactants with stirring to approximately 60-80 deg. C. to render the paraformaldehyde and water into formaldehyde; and (C) Reacting the reaction mixture from (B) at approximately 80-98 deg. C. for at least 12 hours.

It is a yet further object of the invention to provide a method of making an aqueous corrosion inhibitor wherein the molar ratio of the reactants is 1.0 rosin amine component: 1.0 non-flammable liquid ketone component: 2.0 formaldehyde: 1.0 glycolic acid.

Other than in the operating examples, or where otherwise indicated, all numbers expressing quantities of ingredients, reaction conditions, or defining ingredient parameters used herein are to be understood as modified in all instances by the term "about". Unless otherwise indicated, all percentages are percent by weight.

DETAILED DESCRIPTION OF PREFERRED EMBODIMENTS

This invention relates lo corrosion inhibitor compositions useful in corrosion inhibitor compositions, to the corrosion inhibitor compositions used in acid cleaners and to acid cleaning/pickling compositions for metal surfaces containing a mixture of ingredients that inhibit corrosion by the acid in the cleaner, as ell as processes of making and using these substances. The acid cleaner compositions of this invention are used to remove water-insoluble, acid-soluble, deposits, such as by way of non-limiting example, scale or mineral deposits, from metal surfaces.

The corrosion inhibitor compositions of the invention comprise, preferably consist essentially of, most preferably consist of the reaction products of:

A. At least one rosin amine component;

B. At least one non-flammable liquid ketone component;

C. At least one carboxylic acid component;

D. At least one paraformaldehyde component; and

E. Water

It is desirable, independently for each component, that each component lack a hazardous flash point. That is, independently for each component, it is desirable that each component have a flash point that is at least, in increasing order of preference 120, 130, 140, 150, 155, 160, 165, 170, 175, 180 deg. F. It is further desirable, independently for each organic component, that each organic component used is a non-volatile organic compound (non-VOC). The term non-VOC will be understood to mean organic compounds which have a vapor pressure at ambient temperature of less than 0.1 mm Hg. The reduction in usage of volatile organic compounds (VOC) as compared to the acetone/liquid formaldehyde raw materials of the prior art, results in a more environmentally friendly manufacturing process.

In a preferred embodiment, each of the components used has a flash point greater than or equal to 120 deg. F., most preferably one or more of the components has a flashpoint of at least 150 deg. F.

Component A comprises, preferably consists essentially of, most preferably consists of at least one rosin amine. The term rosin amine as used herein designates those primary amines which are made from rosin or rosin acids and may be considered as broadly including compounds containing the abietyl, hydroabietyl and dehydroabietyl radicals. In a preferred embodiment the rosin amine component comprises, preferably consists essentially of dehydroabietylamine. Commercially available rosin amine products designated as dehydroabietylamines generally are described by the manufacturer as containing approximately 90 wt % high molecular weight primary amines, at least 50 wt % being dehydroabietylamine. The presence of the mixture of primary amines is within the scope of the invention and recognized by those of skill in the art to be typical of rosin amine products derived from natural materials. Although purified dehydroabietylamine can be used it increases the cost of the product.

Component B comprises, preferably consists essentially of, most preferably consists of at least one non-flammable liquid ketone. The term non-flammable liquid as used herein designates those materials having a flash point of greater than or equal to 100 deg. F. Suitable non-flammable liquid ketones include acetophenone, hydroxyacetophenone and di-acetophenone: acetophenone is preferred. The at least one nonflammable liquid ketone is present in amounts which provide a molar ratio of at least one nonflammable liquid ketone to rosin amine of at least, in increasing order of preference, 0.50, 0.60, 0.70, 0.80, 0.90, 1.0, 1.1, 1.2, 1.3, 1.4, and not more than, in increasing order of preference 2.5, 2.4, 2.3, 2.2, 2.1, 2.0, 1.9, 1.8, 1.7, 1.6, or 1.5. Use of non-flammable liquid ketones in amounts lower than recited herein tends to result in less acid inhibition, while higher amounts resulted in lower solubility of the composition.

Component C comprises, preferably consists essentially of, most preferably consists of at least one carboxylic acid. In one embodiment, the at least one carboxylic acid component has a flash point of at least 115 deg. F., preferably 125 deg. F. In another embodiment, the at least one carboxylic acid is selected from the group consisting of formic, glycolic, and citric acids; glycolic acid being preferred. Applicants haste replaced the HCl used in prior art methods of manufacture with carboxylic acid which allows use of non-glass-lined stainless steel reactors and equipment and also eliminates the potential for formation of a powerful carcinogen bischloromethylether (BCME), which has a TLV of 1 part per billion (ppb) in the gas phase during manufacture. The elimination of chloride in the composition allows use of corrosion inhibitor compositions of the invention in applications where the chloride ion is prohibited when present over certain levels, such as nuclear power plant cleanout compositions. The at least one carboxylic acid is present in amounts which provide a molar ratio of at least one carboxylic acid to rosin amine of at least, in increasing order of preference, 0.50, 0.60, 0.70, 0.80, 0.90, 1.0, 1.1, 1.2, 1.3, 1.4, and not more than, in increasing order of preference 2.5, 2.4, 2.3, 2.2, 2.1, 2.0, 1.9, 1.8, 1.7, 1.6, or 1.5.

An additional improvement from the manufacturing point of view is the reduction or elimination of the unstable and hazardous liquid formaldehyde used in prior art synthesis methods. Component D comprises, preferably consists essentially of, most preferably consists of, at least one paraformaldehyde. While liquid formaldehyde, or a mixture of paraformaldehyde and liquid formaldehyde can be used, selection of the solid polymer paraformaldehyde, as the raw material of Component D, eliminates many of the drawbacks of liquid formaldehyde use, while still providing monomeric formaldehyde. Paraformaldehyde does not need the heated storage of uninhibited formaldehyde, is more stable than uninhibited formaldehyde and does not contain the flammable methanol solvent used in inhibited formaldehyde. The solid paraformaldehyde is also less hazardous than the liquid since it does not give off as much formaldehyde fume as the liquids. In a preferred embodiment the formaldehyde component is paraformaldehyde. The at least one formaldehyde component is present in amounts which provide a molar ratio of at least one paraformaldehyde (calculated as moles of formaldehyde) or formaldehyde to rosin amine of at least in increasing order of preference, 0.8, 0.9, 1.0, 1.1, 1.2, 1.3, 1.4, 1.5, 1.6, 1.7, 1.8, 1.9, 2.0, 2.1, 2.2, 2.3, 2.4, and preferably not more than in increasing order of preference 4.2, 4.1, 4.0, 3.9, 3.8, 3.7, 3.6, 3.5, 3.4, 3.3, 3.2, 3.1, 3.0, 2.9, 2.8, 2.7, 2.6, 2.5. Use of lower amounts of paraformaldehyde than those recited herein tends to result in lower solubility of the composition and loss of inhibition performance. Although higher amounts of the formaldehyde component can be used, they resulted in higher residual formaldehyde in the composition, which is undesirable as it is a known carcinogen and is a regulated, reportable substance under certain environmental, safety and health regulations.

In one preferred embodiment, the corrosion inhibitor composition has a flash point (cc) of greater than in increasing order of preference, 140, 150, 155, 160, 165, 170, 175, 180, 185, 190, 195, 200 deg. F. In another preferred embodiment, the corrosion inhibitor composition is a clear viscous one-phase amber liquid. These physical characteristics are an improvement over known prior art rosin amine derivatives which are two-phase, with a gummy lower phase that is difficult to redistribute, and have lower flash points in the range of about 89 deg. F.

In one preferred embodiment, the corrosion inhibitor composition comprises the reaction products of dehydroabietylamine; acetophenone, glycolic acid, and paraformaldehyde in the presence of water.

A process for making the corrosion inhibitor compositions of the invention comprises:

(A) Mixing, in a sealed reactor, the following reactants: at least one rosin amine component, at least one non-flammable liquid ketone component, at least one carboxylic acid component having a flash point of at least 115 deg. F., at least one paraformaldehyde component and water;

(B) Heating the reactants with stirring to approximately 60-80 deg. C. to render the paraformaldehyde and water into formaldehyde; and (C) Reacting the reaction mixture from (B) at approximately 80-98 deg. C. for at least 12 hours.

In one embodiment, the reaction mixture is reacted in increasing order of preference, for 18, 24, 36 hours. In another embodiment, reactants are heated to 90 deg. C.

After making the corrosion inhibitor composition of the invention according to the one-step process described herein, using acetophenone, glycolic acid and paraformaldehyde, the reaction products ere analyzed. Applicants surprisingly discovered that the Mannich condensation of a ketone component with a rosin amine component, thought to be the main reaction in the synthesis, was not. Only minor amounts of Mannich condensation reaction products between a single ketone and a single rosin amine were present. The majority of the reaction products present were molecules with three six-carbon rings and molecules with seven six-carbon rings, present in the solution as salts of glycolic acid. It is preferred that the amount of Mannich condensation reaction products be less than, in increasing order of preference, 10, 9, 8, 7, 6, 5, 4, 3, 2, 1, 0.5 wt %. It is also preferred that the total amount of reaction products present as molecules with three six-carbon rings and molecules with seven six-carbon rings be at least, in increasing order of preference, 50, 60, 70, 80, 90, 95 wt %. In one preferred embodiment more than 75% of the reaction products are comprised of molecules hatting less than four six-member carbon rings and/or molecules having more than six six-member carbon rings.

In one preferred embodiment, the reaction products comprise at least one compound represented by formula I:

where R1 and R2 are CH or R1 and R2 are CH2, and, independently of R1 and R2, R3 and R4 are CH or R3 and R4 are $CH_2$.

In a particularly, preferred embodiment, the reaction products comprise at least 30 wt % of the at least one compound represented by formula I.

In one preferred embodiment, the reaction products comprise compounds represented by formula II, and preferably consist essentially of, most preferably consist of at least one compound of formula I and additional compounds represented by formula II:

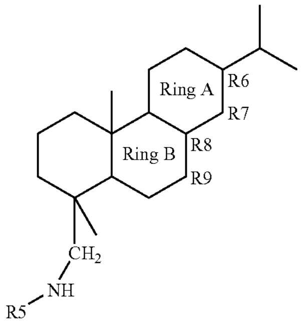

where R5 is a methyl or ethyl group, and independently. Ring A is either aromatic or has a double bond between R6 and R7, and Ring B is saturated or has a double bond between R8 and R9 when Ring A has a double bond and is saturated when Ring A is aromatic. The R6-R9 moieties are either C, CH or $CH_2$ depending on the location of double bonds, as will be readily understood by those of skill in the art.

The aqueous corrosion inhibiting compositions (and the acid cleaners themselves) of this invention contain as essential ingredients: A corrosion inhibitor composition according to the invention, as described above.

Corrosion inhibitor compositions may additionally comprise at least one of: a surfactant, an acetylenic alcohol, a solvent, a pH adjuster and/or water. Suitable surfactants include anionic, nonionic and/or amphoteric surfactants. Desirably, the surfactant comprises a nonionic ethoxylate. Ethoxylated phenol surfactants have historically been found to be very effective in terms of cost, safety and performance in inhibitor formulations of the type described. However, due to recent environmental concerns regarding some ethoxylated phenol (especially octyl and nonyl phenol ethoxylates) surfactants; formulations free of these materials were investigated. In a preferred embodiment, the surfactant comprises an ethoxylated, saturated or unsaturated aliphatic alcohol.

In one embodiment, the acetylenic alcohol comprises ethyloctynol and/or methylbutynol. In one embodiment, the solvent comprises an alcohol, different from the acetylenic alcohol, comprising a primary alcohol, an alcohol containing an ether moiety, such as 2-butoxyethanol and/or glycols or polyglycols. In a preferred embodiment, the corrosion inhibitor compositions comprise a non-flammable solvent, most preferably a solvent that is not a volatile organic compound (VOC).

Acid cleaner compositions according to this invention, in addition to an acid and water, contain corrosion inhibitor compositions of the invention, which may be in the form of an aqueous concentrate, or which may be mixed separately with the acid and water.

The foregoing ingredients, either individually or in concentrate form, are combined with aqueous acid solutions that have known utility as metal cleaners/picklers. Generally, any acid may be used in the aqueous acid cleaner solutions according to the invention, provided critically that the acid is water-soluble and effective for cleaning metal surfaces. Preferably, the acid and acid cleaner are environmentally safe and/or biodegradable. Examples of known acids useful in metal cleaners/picker products are: inorganic acids such as hydrochloric (muriatic), sulfuric, boric, nitric, phosphoric, and the like; and organic acids such as formic, citric, acetic, sulfamic, glycolic, benzoic, oxalic, mono-, di-or tri-chloracetic, various $C_{2-22}$ carboxylic acids, and the like. Mixtures of these acids are also useful. The acids in the aqueous solutions are at least minimally present in a cleaner-effective amount, particularly concentrations of 1 to 50% by weight, more preferably in a concentration of 5 to 30% by weight, most preferably 5 to 15% by weight. Hydrochloric acid, sulfamic acid, and/or sodium bisulfate are preferred.

EXAMPLES

Selection of Acetone Replacement:

Several materials were evaluated for replacing acetone, which can undergo Mannich condensation with higher molecular weight ketones or other materials that can undergo Mannich condensation, as a reactant with dehydroabietylamine, glycolic acid and paraformaldehyde. Materials evaluated all had lower vapor pressure than acetone which made them non-flammable (in most cases) and allowed heating to 90 deg. C. in the second step. Only one equivalent of acetone replacement and one equivalent of paraformaldehyde (as formaldehyde) were used in the second reaction step without distillation. The materials evaluated were higher molecular weight ketones and acetylenic alcohols: acetophenone, 2-hydroxyacetophenone, diacetone alcohol, methylhexylketone, furfural alcohol.

Most of the above-identified materials evaluated formed heavy deposits on the metal surface and the glass during acid testing, or formed solids during the synthesis. 2-hydroxyacetophenone had the best performance, but still tended to leave a noticeable film on the glass after testing as an acid inhibitor and was considered expensive.

A commercial product, GP-2714 corrugating resin, which is reported by the manufacturer as 45% solids in water formaldehyde-acetone condensate CAS 25619-09-4, available from Georgia Pacific Company, was also tested. Due to the unknown exact chemistry of GP-2714 at the time, a control without GP-2714 as done using acetophenone, glycolic acid and paraformaldehyde. The reaction products of the control components (Formula A) was a stable material with low residual formaldehyde in spite of the fact that there was twice the amount of paraformaldehyde present than was expected to react. Corrosion inhibition performance of Formula A, in an acid cleaner, was slightly better than with GP-2714. Improved performance on 304 and 316SS was noted for the reaction product of Formula A, as it was for the reaction product of 2-hydroxyacetophenone, glycolic acid and paraformaldehyde.

Acid Inhibitor Synthesis

Comparative Example 1

To a 250 ml 3 neck round bottom flask equipped with a water-cooled condenser, overhead mixer, thermocouple/heating mantle, sealed and under slight nitrogen pressure (via bubbler) added (with continued mixing throughout):

42.89 g Corsamine DHA (Corsamine DHA is a mixture of high molecular weight primary amines comprising approximately 60% by weight dehydroabietylamine commercially available from Corsicana Technologies, Corsicana, Texas.)

12.43 g acetophenone 15.92 g 20' baume hydrochloric acid (20'=~32% wt/wt HCl in $H_2O$) added slowly, generated dense white fumes. After acid addition, temperature increased from 28 to 62 deg. C., a 34 deg. C., exotherm.

6.20 g 92% paraformaldehyde 6.20 g deionized water

The mixture was warmed to 75 deg. C. and held 30 min to decompose the paraformaldehyde, then heated to 90 deg. C. and held with mixing for 18 hours, followed by cooling to 50 deg. C. Added 37.5 g acetone (solution went from orange-yellow cloudy to clear) and then added 12.11 g deionized water and 6.11 g 92% paraformaldehyde. This second mixture was warmed to 60 deg. C. and then refluxed. Initial reflux was at 66 deg. C. The reflux temperature increased during the first 6 hours to 69 deg. C.

After 18 hours reflux, a distillation head was added and the excess acetone as removed by heating to 90 deg. C. Distillate amount collected was 20.39 g clear liquid. 113.6 g hazy brown product was bottled, which later formed 2 layers as expected and contained approximately 900 ppm residual formaldehyde.

Example 1

To a 1 liter 3 neck round bottom flask equipped with a water-cooled condenser, overhead mixer, thermocouple/heating mantle, sealed and under slight nitrogen pressure (via bubbler), added (with continued mixing throughout):

450 g Corsamine DHA 130.14 g acetophenone 154.8 g glycolic acid (70%) added all at once without fuming.

After acid addition, temperature increased from 23 to 59 deg. C., a 36 deg. C. exotherm. With temperature at 60 deg. C., 70.86 g 92% paraformaldehyde was added (×2 equivalents versus acetophenone) and then 105.33 g deionized water.

The mixture was warmed to 80 deg. C. The solution became milky as the paraformaldehyde decomposed. The mixture was allowed to cool to 75 deg. C. and held for 30 minutes during which time the solution became clear. The mixture was warmed to 90 deg. C. and held 12 hours (remained clear). The resulting substance was then cooled to room temperature and the solution was a clear/amber moderately viscous solution.

Formaldehyde level, determined on a dilution which was made alkaline and filtered before testing (used QCTM 613L colorimetric method based on Purpald), showed 110 ppm residual formaldehyde in the product.

Example 2 (Comparative: HCl was Used in Place of Glycolic Acid)

To a 100 ml 3 neck round bottom flask equipped with a water-cooled condenser, overhead mixer, thermocouple/heating mantle, sealed and under slight nitrogen pressure (via bubbler) added (with continued mixing throughout):

25.0 g Corsamine DHA 7.25 g acetophenone 9.28 g 20' baume hydrochloric acid (20'=~32% wt/st HCl in $H_2O$) added slowly (generated dense white fumes and solution became greenish in color.

After acid addition, the temperature increased from 23 to 50 deg. C., a 27 deg. C. exotherm.

The mixture was warmed to 60 deg. C. and 3.93 g 92% paraformaldehyde and 6.53 g deionized water added, and then the mixture was warmed to 70 deg. C., and held for 30 minutes. The mixture was then warmed to 90 deg. C. and held 12 hours. The resulting solution was cooled to a highly viscous, amber/brown/opaque material. Residual formaldehyde was 276 ppm.

Example 3 (Like Example 1 but 1/10 the Size and 10% Less Acetophenone)

To a 100 ml 3 neck round bottom flask equipped with a water-cooled condenser, overhead mixer, thermocouple/heating mantle, sealed and under slight nitrogen pressure (via bubbler) added (with continued mixing throughout):

45.0 g Corsamine DHA 11.74 g acetophenone 15.48 g glycolic acid (70%) added all at once without fuming.

After acid addition, temperature increased from 23 to 59 deg. C., a 36 deg. C. exotherm. With temperature at 60 deg. C. 7.09 g 92% paraformaldehyde was added and then 10.53 g deionized water. The mixture was warmed to 70 deg. C. and held for 30 minutes.

The mixture was then warmed to 90 deg. C. and held 12 hours (remained clear). Residual formaldehyde was 130 ppm.

Example 4 (Like Example 1 but 1/10 the size and 10% Additional Acetophenone)

To a 100 ml 3 neck round bottom flask equipped with a water-cooled condenser, overhead mixer, thermocouple/heating mantle, sealed and under slight nitrogen pressure (via bubbler) added (with continued mixing throughout):

45.0 g Corsamine DHA 14.35 g acetophenone 15.48 g glycolic acid (70%) added all at once without fuming.

After acid addition, temperature increased from 23 to 59 deg. C., a 36 deg. C. exotherm. With temperature at 60 deg. C., 7.09 g 92% paraformaldehyde was added and then 10.53 g deionized water. The mixture was warmed to 70 deg. C. and held for 30 minutes.

The mixture was then warmed to 90 deg. C. and held for 12 hours (remained clear). Residual formaldehyde was 98 ppm

Example 5 (Like Example 1 but 1/10 the Size and 50% Extra Paraformaldehyde)

To a 100 ml 3 neck round bottom flask equipped with a water-cooled condenser, overhead mixer, thermocouple/heating mantle, sealed and under slight nitrogen pressure (via bubbler) added (with continued mixing throughout):

45.0 g Corsamine DHA 13.04 g acetophenone 15.48 g glycolic acid (70%) added all at once.

After acid addition, temperature increased from 23 to 59 deg. C., a 36 deg. C. exotherm. With temperature at 60 deg. C., 10.63 g 92% paraformaldehyde was added (×3 equivalents versus acetophenone) and then 15.8 g deionized water. The mixture was warmed to 70 deg. C. and held for 30 minutes.

The mixture was then warmed to 90 deg. C. and held 12 hours (remained clear). Residual formaldehyde was 3,800 ppm.

Formulation Into Inhibitor Compositions To Test Inhibition of Hydrochloric Acid

Each "F" example contained an equivalent amount of amine based on Corsamine DHA.

Comparative F: To 37.59 g Comparative Example 1. 8.03 g Tergitol NP-15 and 4.38 g isopropyl alcohol were added. To 13.5 g of this mixture was added 1.35 g ethyloctynol. 3.15 g methylbutynol, 9.00 g Igepal CO-850 and 23.0 g deionized water. Tergitol NP-15 is a nonylphenol ethoxylate containing surfactant commercially available from Dow Chemical Company and Igepal CO-850 is a nonylphenol ethoxylate containing surfactant commercially available from Rhodia Novecare.

Example 1F: To 28.95 g Example 1, 8.03 g Tergitol NP-15, 8.64 g deionized water, 4.38 g isopropyl alcohol were added. To 13.5 g of this mixture was added 1.35 g ethyloctynol, 3.15 g methylbutynol, 9.00 g Igepal CO-850 and 23.0 g deionized water.

Example 2F: Prepared according to the procedure for Example 1F, but used 28.86 g Example 2 in place of Example 1.

Example 3F: Prepared according to the procedure for Example 1F, but used 28.54 g Example 3 in place of Example 1.

Example 4F: Prepared according to the procedure for Example 1F, but used 29.36 g Example 4 in place of Example 1.

Example 5F: Prepared according to the procedure for Example 1F. but used 31.76 g Example 5 in place of Example 1.

Inhibitor Formulations Mixed with Hydrochloric Acid and Tested on Metal Surfaces Testing for corrosion inhibition performance of corrosion inhibitor formulations Comparative Example F and Examples 1F-5F in acid cleaners was performed. Solutions were made of 2.06 g/2L of inhibitor formulations in 2-liter solutions containing DI water and 447 ml 37.9% HCl (10.0% wt/vol)/2 L. The solutions were stirred during testing, covered with water-cooled watch glasses and maintained at 180 deg. F. Two panels were used per test. Each panel was an isopropyl alcohol-wiped (IPA wiped) 2"×4" coupon of 1008 alloy cold rolled steel. Panels were suspended on plastic coated hooks during testing. Table 1 shows the loss of mass of metal from the coupons tested:

TABLE 1

| | Init Wt. (g) | After 30 Min. (g) | Loss (g) | Avg. Loss (g) |
|---|---|---|---|---|
| Comp. Ex. F | 32.7233 | 32.7156 | 0.0077 | 0.0086 |
| | 32.7259 | 32.7165 | 0.0094 | — |
| Example 1F | 32.6107 | 32.6029 | 0.0078 | 0.0076 |
| | 32.7989 | 32.7916 | 0.0073 | — |
| Example 2F | 33.0699 | 33.0593 | 0.0106 | 0.0103 |
| | 32.8447 | 32.8348 | 0.0990 | — |
| Example 3F | 32.5812 | 32.5736 | 0.0076 | 0.0088 |
| | 32.8638 | 32.8539 | 0.0099 | — |
| Example 4F | 32.7686 | 32.7634 | 0.0052 | 0.0064 |
| | | 32.5423 | 0.0075 | — |
| Example 5F | 33.2428 | 33.2377 | 0.0051 | 0.0067 |
| | 33.2373 | 33.2290 | 0.0083 | — |

Using fresh panels, the same solutions used above provided additional data for 18 hours exposure of metal panels. The results are shown in Table 2:

TABLE 2

| | Init Wt. (g) | After 18 Hours (g) | Loss (g) | Avg. Loss (g) |
|---|---|---|---|---|
| Comp. Ex. F | 32.7016 | 32.5371 | 0.1645 | 0.1622 |
| | 32.5517 | 32.3919 | 0.1598 | — |
| Example 1F | 32.8150 | 32.6457 | 0.1693 | 0.1494 |
| | 33.1520 | 32.9893 | 0.1627 | — |
| Example 2F | 32.8849 | 32.7340 | 0.1509 | 0.1524 |
| | 33.6962 | 32.5423 | 0.1539 | — |
| Example 3F | 33.2744 | 33.1223 | 0.1521 | 0.1467 |
| | 32.7976 | 32.6564 | 0.1412 | — |
| Example 4F | 32.8572 | 32.7126 | 0.1446 | 0.1520 |
| | 32.9770 | 32.8176 | 0.1594 | — |
| Example 5F | 32.7349 | 32.5854 | 0.1495 | 0.1486 |
| | 32.5832 | 32.4356 | 0.1476 | — |

Note:
4F and 5F have higher than normal residue on glass. 5F has high residual formaldehyde Stainless Steel Testing:

Fresh baths were made up for testing of corrosion protection provided to stainless steel by the invention. Testing for corrosion inhibition of inhibitor formulations Comparative Example F and Examples 1F-2F was performed. Solutions were made of 2.06 g/2L of inhibitor in 2-liter solutions containing DI water and 447 ml 37.9% HCl (10.0% wt/vol)/2 L. The solutions were stirred during testing, covered with water-cooled watch glasses and maintained at 180 deg. F. One 304 stainless steel panel and one 316 stainless steel panel were used for each composition. Each panel was an isopropyl alcohol-wiped (IPA wiped) 2"×4" panel. Panels were suspended on plastic coated hooks during testing.

Table 3 shows the loss of mass of metal from the coupons tested after 24 hours:

TABLE 3

| | Init Wt. (g) | After 24 Hours (g) | Loss (g) |
|---|---|---|---|
| Comp. Ex. F | 34.9261 (304) | 34.6506 | 0.2755 |
| | 35.2274 (316) | 34.2254 | 1.0020 |
| Example 1F | 34.8816 (304) | 34.6088 | 0.2728 |
| | 35.4093 (316) | 34.7858 | 0.6236 |
| Example 2F | 34.5901 (304) | 34.2869 | 0.3032 |
| | 35.4947 (316) | 34.3305 | 1.1642 |

Iron Loading Study:

Iron Loading Example 1:

Testing for corrosion inhibition of inhibitor formulations Comparative Example F and Examples 1F and 3F under conditions designed to simulate a used cleaner bath was performed. 2.06 g/2L of inhibitor in 2-liter solutions containing DI water. 447 .ml 37.9% HCl (10.0% wt/vol) and 178 g $FeCl_2.4H_2O$ (2.5% $Fe^{+2}$)/2 L. The solutions were stirred during testing, covered with water-cooled watch glasses and maintained at 180 deg. F. Two panels were used per test. Each panel was an isopropyl alcohol-wiped (IPA wiped) 2"×4" coupon of 1008 alloy cold rolled steel. Panels were suspended on plastic coated hooks during testing. Table 4 shows the loss of mass of metal from the coupons tested:

TABLE 4

| | Init Wt. (g) | After 3 Hours (g) | Loss (g) | Avg. Loss (g) |
|---|---|---|---|---|
| Comp. Ex. F | 32.7754 | 32.7099 | 0.0655 | 0.0651 |
| | 33.0898 | 32.0251 | 0.0647 | — |
| Example 1F | 32.6278 | 32.5621 | 0.0657 | 0.0658 |
| | 32.4628 | 32.3969 | 0.0659 | — |
| Example 3F | 32.8380 | 32.7766 | 0.0614 | 0.0613 |
| | 32.8064 | 32.7452 | 0.0612 | — |

Iron Loading Example 2:

The same baths as for Iron Loading Example 1 were heated to evaporate ~200 ml, and 178 g additional $FeCl_2.4H_2O$ (5.0% $Fe^{+2}$) was added. The solution was titrated for % HCl and additional 37% HCl was added to adjust the cleaner bath concentration of HCl back to 10% wt/vol. Fresh 1008 alloy panels were run according the to procedure used for Iron Loading Example 1. Table 5 shows the loss of metal from the coupons tested:

TABLE 5

| | Init Wt. (g) | After 3 Hours (g) | Loss (g) | Avg. Loss (g) |
|---|---|---|---|---|
| Comp. Ex. F | 32.9912 | 32.8372 | 0.1540 | 0.1561 |
| | 33.7087 | 32.5505 | 0.1582 | — |
| Example 1F | 32.7969 | 32.6254 | 0.1715 | 0.1697 |
| | 32.8784 | 32.7105 | 0.1679 | — |
| Example 3F | 32.9358 | 32.6880 | 0.2478 | 0.2517 |
| | 33.0098 | 32.7543 | 0.2555 | — |

Iron Loading Example 3:

In the same baths as used for Iron Loading Example 2 (5.0% $Fe^{+2}$) one each 2"×4" 316 and 304 alloy stainless steel panels were tested at 180 deg. F.

Table 6 shows the loss of metal for the panels tested:

TABLE 6

| | Init Wt. (g) | After 1 Hour (g) | Loss (g) |
|---|---|---|---|
| Comp. Ex. F | 34.8096 (304) | 34.7539 | 0.0557 |
| | 35.3142 (316) | 35.2817 | 0.0325 |
| Example 1F | 35.1689 (304) | 35.1278 | 0.0411 |
| | 35.2903 (316) | 35.2615 | 0.0288 |
| Example 3F | 34.7683 (304) | 34.7087 | 0.0596 |
| | 35.3551 (316) | 35.3192 | 0.0359 |

Iron Loading Example 4:

The same baths as for Iron Loading Example 3 were heated to evaporate ~200 ml, and 178 g additional FeCl2.4H2O (7.5% Fe+2) was added. The solution was titrated for % HCl and additional 37% HCl was added to adjust the cleaner bath concentration of HCl back to 10% wt/vol. Fresh 1008 alloy panels were run according the to procedure used for Iron Loading Example 1.

Table 7 shows the loss of metal from the coupons tested:

TABLE 7

| | Init Wt. (g) | After 3 Hours (g) | Loss (g) | Avg. Loss (g) |
|---|---|---|---|---|
| Comp. Ex. F | 32.8228 | 32.5069 | 0.3159 | 0.3104 |
| | 32.7598 | 32.4550 | 0.3048 | — |
| Example 1F | 32.8278 | 32.5633 | 0.2912 | 0.2979 |
| | 32.6953 | 32.4271 | 0.2682 | — |
| Example 3F | 32.8203 | 32.3593 | 0.4610 | 0.4722 |
| | 32.9702 | 32.4868 | 0.4834 | — |

Iron Loading Example 5:

In the same baths as used for Iron Loading Example 4 (7.5% $Fe^{+2}$) one each 2"×4" 316 and 304 alloy stainless steel panels were tested at 180 deg. F. Table 8 shows the loss of metal for the coupons tested:

TABLE 8

| | Init Wt. (g) | After 30 Min. (g) | Loss (g) |
|---|---|---|---|
| Comp. Ex. F | 34.8254 (304) | 34.7230 | 0.1024 |
| | 35.5200 (316) | 35.4840 | 0.0360 |
| Example 1F | 34.7062 (304) | 34.6350 | 0.0712 |
| | 35.3098 (316) | 35.2766 | 0.0332 |
| Example 3F | 34.8651 (304) | 34.6894 | 0.1757 |
| | 35.5070 (316) | 35.4608 | 0.0462 |

Formulation Into Final Inhibitor Compositions For Testing Chelating Acid Type Inhibitors Each "FB" example contains equivalent amine content based on Corsamine DHA.

Comparative FB: To 56.4 g of Comparative Example 1, was added 12.04 g Tergitol NP-15 and 6.56 g isopropyl alcohol. To this mixture was added 11.85 g Tergitol NP-9, 3.65 g 1,3 dibutylthiourea, 7.25 g Pamak 4A (fatty and rosin acids commercially available from Eastman Chemical Company, reported by the manufacturer to be predominately straight-chain, 18 carbon mono- and di-unsaturated fatty acids containing and some 16 and 20 carbon fatty acids and moderate amounts of rosin acid), 9.10 g of a polyethylene glycol of molecular weight about 600, 14.55 g Igepal CO-850 and 14.05 g propylene glycol. This second mixture was warmed to 110 deg. F. with mixing and became clear in 15 minutes. To the solution was added 14.55 g isopropyl alcohol, 2.73 g ethyloctynol and 22.27 g deionized water.

Example 1FB: To 40.65 g Example 1, was added 15.75 g deionized water, 12.04 g Tergitol NP-15 and 6.56 g 2-butoxyethanol. To this mixture was added 11.85 g Tergitol NP-9, 3.65 g 1,3 dibutylthiourea, 7.25 g Pamak 4A (fatty and rosin acids), 9.10 g of a polyethylene glycol of molecular weight about 600, 14.55 g Igepal CO-850 and 14.05 g propylene glycol. This second mixture was warmed to 110 deg. F. with mixing and became clear in 15 minutes). To the solution was added 14.55 g 2-butoxyethanol, 2.73 g ethyloctynol and 22.27 g deionized water.

Citric Acid Evaluation:

Testing for corrosion inhibition of inhibitor formulations Comparative Example FB and Example 1FB was performed. Solutions were made of 2.06 g/2L of inhibitor in 2-liter solutions containing DI water and 80.0 g anhydrous citric acid (4.0% wt/vol pH=1.88)/2 L. A separate uninhibited 2-liter solution containing DI water and 80.0 g anhydrous citric acid was also made. The solutions were stirred during testing, covered with water-cooled watch glasses and maintained at 180 deg. F. Two panels were used per test. Each panel was an isopropyl alcohol-wiped (IPA wiped), 2"×4" coupon of 1008 alloy cold rolled steel. Panels were suspended on plastic coated hooks during testing. Table 9 shows the loss of mass of metal from the coupons tested with no inhibitor after only on hour. Exposure over 24 hours to the acid cleaner of Table 9 results in a calculated loss of mass of about 12.9 grams.

TABLE 9

| | Init Wt. (g) | After 1 Hour (g) | Loss (g) | Avg. Loss (g) |
|---|---|---|---|---|
| No inhibitor | 32.8604 | 32.3204 | 0.5320 | 0.5356 |
| | 32.9304 | 32.3912 | 0.5392 | |

Table 10 shows the loss of mass of metal from the coupons tested with inhibitor after twenty-four (24) hours.

TABLE 10

| | Init Wt. (g) | After 24 Hours (g) | Loss (g) | Avg. Loss (g) |
|---|---|---|---|---|
| Comp. Ex. FB | 32.8752 | 32.7315 | 0.1437 | 0.1487 |
| | 32.8047 | 32.6511 | 0.1536 | — |
| Example 1FB | 32.7573 | 32.6315 | 0.1258 | 0.1317 |
| | 32.8864 | 32.7489 | 0.1375 | — |

Hydrochloric Acid Evaluation:

Testing for corrosion inhibition of inhibitor formulations Comparative Example FB and Example 1FB was performed. Solutions were made of 4.12 g/2 L of inhibitor in 2-liter solutions containing DI water and 447 .ml 37.9% HCl (10.0% wt/vol)/2 L. The solutions were stirred during testing, covered with water-cooled watch glasses and maintained at 190 deg. F. Two panels were used per test. Each panel was an isopropyl alcohol-wiped (IPA wiped), 2"×4" coupon of 1008 alloy cold rolled steel. Panels were suspended on plastic coated hooks during testing. Table 11 shows the loss of mass of metal from the coupons tested:

TABLE 11

| | Init Wt. (g) | After 24 Hours (g) | Loss (g) | Avg. Loss (g) |
|---|---|---|---|---|
| Compare FB | 33.7336 | 31.4420 | 2.0611 | 2.1206 |
| | 32.8525 | 30.6725 | 2.1800 | — |
| Example 1FB | 32.8201 | 31.5919 | 1.2282 | 1.2116 |
| | 33.0428 | 31.8479 | 1.1949 | — |

Examples Free of Ethoxylated Phenols in Hydrochloric Acid Evaluations:

Formulations using surfactants which do not contain ethoxylated phenol were investigated. Stable premixes were prepared as follows:

Example 6F: To 28.95 g Example 1, 8.03 g of a commercial ethoxylated alcohol identified as CAS 9004-98-2 (Poly(oxy-1,2-ethanediyl), a-(9Z)-9-octadecenyl-w-hydroxy-), 4.37 g 2-butoxyethanol, 8.65 g deionized water was added and mixed to form a clear solution Example 7F: To 28.95 g Example 1, 8.03 g of a commercial ethoxylated alcohol identified as CAS 9004-98-2 (Poly(oxy-1,2-ethanediyl), a-(9Z)-9-octadecenyl-w-hydroxy-), 4.37 g of a commercial solvent identified as CAS 26403-74-7 (Poly (oxy-1,2-ethanediyl), a-(phenylmethyl)-w-hydroxy-), 8.65 g deionized water was added and mixed to form a clear solution. From examples 6F and 7F, the following inhibitor formulations were prepared:

Example 8F: To 13.50 g Example 6F added was added 1.35 g ethyloctynol, 3.15 g methylbutynol, 9.00 g of a commercial surfactant identified as CAS 68920-69-4 (Alcohols, $C_{9-11}$, propoxylated) and 23.0 g deionized water. Split into two layers after mixing. Top layer is 25% of total volume.

Example 9F: Prepare same as Example 8F, but use 13.50 g Example 7F in place of Example 6F. Split into two layers after mixing. Top layer is 25% of total volume.

Example 10F

To 13.50 g Example 6F added was added 1.35 g ethyloctynol, 3.15 g methylbutynol, 4.50 g of a commercial surfactant identified as CAS 68920-69-4 (Alcohols, $C_{9-11}$, propoxylated), 4.50 g of a commercial surfactant identified as CAS 68439-51-0 (Alcohols, $C_{12-14}$, ethoxylated propoxylated) and 23.0 g deionized water. Split into two layers after mixing. Top layer is 12% of total volume.

Example 11F: Prepare same as Example 10F, but use 13.50 g Example 7F in place of Example 6F. Split into two layers after mixing. Top layer is 12% of total volume.

Example 12F: To 13.50 g Example 6F added was added 1.35 g ethyloctynol, 3.15 g methylbutynol, 9.00 g of a commercial ethoxylated alcohol identified as CAS 9004-98-2 (Poly(oxy-1,2-ethanediyl), a-(9Z)-9-octadecenyl-w-hydroxy-) and 23.0 g deionized water. Crystal-clear, one-phase solution. After 10 months, the solution has the same appearance.

Example 13F: Prepare same as Example 12F, but use 13.50 g Example 7F in place of Example 6F. Crystal-clear, one-phase solution. After 10 months, the solution has the same appearance.

Inhibitor Formulations Mixed with Hydrochloric Acid and Tested on Metal Surfaces Testing for corrosion inhibition of inhibitor formulations Comparative Example F and Examples 12F and 13F was performed. Solutions were made of 2.06 g/2 L of inhibitor formulations in 2-liter solutions containing DI water and 447 .ml 37.9% HCl (10.0% wt/vol)/2 L. The solutions were stirred during testing, covered with water-cooled watch glasses and maintained at 180 deg. F. Two panels were used per test. Each panel was an is ispropyl alcohol-wiped (IPA wiped), 2"×4" coupon of 1008 alloy cold rolled steel. Panels were suspended on plastic coated hooks during testing. Table 12 shows the loss of mass of metal from the coupons tested. Note, fresh panels were tested in the same bath after the 2 hr evaluation:

TABLE 12

| | 2 hrs Loss (g) | Avg. Loss (g) | 18 hrs Loss (g) | Avg. Loss (g) |
|---|---|---|---|---|
| Comp. Ex. F | 0.0240 | 0.0234 | 0.1727 | 0.1715 |
| | 0.0228 | — | 0.1702 | — |
| Example 12F | 0.0213 | 0.0210 | 0.1637 | 0.1642 |
| | 0.0206 | — | 0.1647 | — |
| Example 13F | 0.0205 | 0.0204 | 0.1617 | 0.1613 |
| | 0.0202 | — | 0.1609 | — |

In each case, examples 12F and 13F panels showed less metal loss versus Comparative Example F.

Fresh solutions prepared and heated as above provided additional data for exposure of stainless steel panels. One each of 2"×4" 304 and 316 alloy panels were IPA cleaned, weighed and suspended on plastic hooks and exposed as in table 12. Fresh panels were prepared for the 18 hr test and exposed in the same bath used for the 2 hr test. The results are shown in Table 13:

TABLE 13

| | 2 hrs Loss (g) | 18 hrs Loss (g)* |
|---|---|---|
| Comp. Ex. F | 0.0171 (304) | 0.2336 (304) |
| | 0.0413 (316) | 0.6252 (316) |
| Example 12F | 0.0196 (304) | 0.1735 (304) |
| | 0.0518 (316) | 0.6017 (316) |
| Example 13F | 0.0196 (304) | 0.1735 (304) |
| | 0.0499 (316) | 0.5130 (316) |

*Fresh 2 × 4" panels prepared and tested in the solutions used for the 2 hr tests.

Although loss at 2 hrs for 12F and 13F, as compared to Comparative Example F was a slightly higher in each case, the loss, at 18 hrs for 12F and 13F was less in each case. Also noted that although the 12F and 13F inhibited acid solutions were very slightly hazy at room temperature, they were crystal-clear by the time the baths reached 180 deg. F. (before any metal exposure). The behavior of the Comparative Example F is opposite (i.e. initially clear and then moderately hazy at 180 deg. F.).

These results show that commercially acceptable products with superior performance and solubility may be provided without the utilization of ethoxylated phenol surfactants.

What is claimed is:

1. An aqueous corrosion inhibitor, comprising the reaction products of:

(A) at least one rosin amine component;

(B) at least one non-flammable liquid ketone component;

(C) at least one carboxylic acid component having a flash point of at least 115 deg. F.;

(D) at least one formaldehyde component; and (E) water;

wherein molar ratio of (A):(B) is approximately 1:1 and a majority of said reaction products are present as molecules which are not products of Mannich condensation reaction of (A), (B) and (D).

2. The aqueous corrosion inhibitor of claim 1, wherein the aqueous corrosion inhibitor is a single phase liquid having a flash point of at least 180 deg. F.

3. The aqueous corrosion inhibitor of claim 1, wherein more than 75% of the reaction products are comprised of molecules having less than four six-member carbon rings and/or molecules having more than six six-member carbon rings.

4. The aqueous corrosion inhibitor of claim 1, wherein at least 50 wt % of component (A) is dehydroabietylamine.

5. The aqueous corrosion inhibitor of claim 1, wherein component (B) is acetophenone, hydroxyacetophenone and/or di-acetophenone.

6. The aqueous corrosion inhibitor of claim 1, wherein component (C) is formic, glycolic, and/or citric acid.

7. The aqueous corrosion inhibitor of claim 4 wherein component (B) comprises acetophenone, component (C) comprises glycolic acid and component (D) comprises paraformaldehyde.

8. The aqueous corrosion inhibitor of claim 1, wherein the reaction products comprise at least one compound represented by formula I:

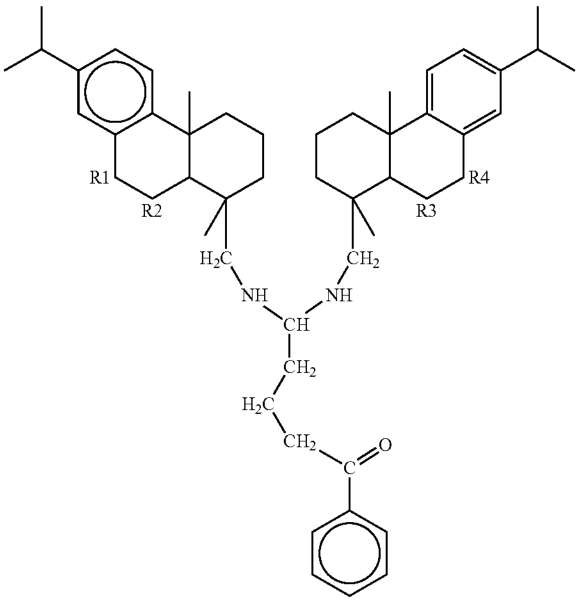

where R1 and R2 are CH or R1 and R2 are $CH_2$, and, independently of R1 and R2, R3 and R4 are CH or R3 and R4 are $CH_2$.

9. The aqueous corrosion inhibitor of claim 1, further comprising at least one of: a surfactant, an acetylenic alcohol, a solvent, and/or a pH adjuster.

10. The aqueous corrosion inhibited acid cleaning composition of claim 9 wherein the surfactant comprises a nonionic ethoxylate.

11. The aqueous corrosion inhibited acid cleaning composition of claim 10 wherein the surfactant comprises an ethoxylated, saturated or unsaturated aliphatic alcohol.

12. The aqueous corrosion inhibitor of claim 8, wherein the reaction products comprise at least 30 wt % of the at least one compound represented by formula I.

13. An aqueous corrosion inhibited acid cleaning composition comprising:

1) from about 1 to about 50% by weight of an acid; and 2) a corrosion inhibiting effective amount of an aqueous corrosion inhibitor, comprising the reaction products of:

(A) at least one rosin amine component;

(B) at least one non-flammable liquid ketone component;

(C) at least one carboxylic acid component having a flash point of at least 115 deg. F.;

(D) at least one paraformaldehyde component; and (E) water;

wherein molar ratio of (A):(B) is approximately 1:1 and a majority of said reaction products are present as molecules which are not products of Mannich condensation reaction of (A), (B) and (D).

14. The aqueous corrosion inhibited acid cleaning composition of claim 13 further comprising at least one of: a surfactant, an acetylenic alcohol, a solvent, and/or a pH adjuster.

15. The aqueous corrosion inhibited acid cleaning composition of claim 14 wherein the surfactant comprises a nonionic ethoxylate.

16. The aqueous corrosion inhibited acid cleaning composition of claim 15 wherein the surfactant comprises an ethoxylated, saturated or unsaturated aliphatic alcohol.

17. A method of cleaning metal comprising contacting a metal surface with the cleaning composition of claim 13.

18. The aqueous corrosion inhibitor of claim 1, wherein molar ratio of (A):(D) is between approximately 1:0.8 and 1:2.

19. The aqueous corrosion inhibited acid cleaning composition of claim 13, wherein molar ratio of (A):(D) is between approximately 1:0.8 and 1:2.

* * * * *